(12) United States Patent
Ganasan et al.

(10) Patent No.: US 7,263,566 B2
(45) Date of Patent: Aug. 28, 2007

(54) METHOD AND APPARATUS OF REDUCING TRANSFER LATENCY IN AN SOC INTERCONNECT

(75) Inventors: J. Prakash Subramaniam Ganasan, Youngsville, NC (US); Perry Willmann Remaklus, Jr., Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 11/027,532

(22) Filed: Dec. 30, 2004

(65) Prior Publication Data

US 2006/0149874 A1    Jul. 6, 2006

(51) Int. Cl.
G06F 13/366    (2006.01)
(52) U.S. Cl. .................. 710/118; 710/110; 710/241; 710/244; 709/211
(58) Field of Classification Search .............. 710/33, 710/41, 107, 110, 112, 244, 309; 711/158
See application file for complete search history.

(56) References Cited

U.S. PATENT DOCUMENTS

| 5,745,913 | A |   | 4/1998  | Pattin et al. |        |
|-----------|---|---|---------|---------------|--------|
| 5,802,330 | A |   | 9/1998  | Dutton        |        |
| 5,848,297 | A |   | 12/1998 | Krein et al.  |        |
| 5,907,688 | A | * | 5/1999  | Hauck et al. ............... | 710/107 |
| 6,304,923 | B1 | * | 10/2001 | Klein ........................... | 710/41  |
| 6,823,411 | B2 | * | 11/2004 | Hofmann et al. ........... | 710/110 |
| 6,907,478 | B2 | * | 6/2005  | Li et al. ........................ | 710/33  |
| 7,051,172 | B2 | * | 5/2006  | Mastronarde et al. ....... | 711/158 |
| 7,054,970 | B2 | * | 5/2006  | Kim ........................... | 710/113 |
| 7,096,293 | B2 | * | 8/2006  | Lee ............................ | 710/244 |
| 2002/0188809 | A1 |   | 12/2002 | Kershaw |  |
| 2004/0024987 | A1 |   | 2/2004  | Lentz et al. |  |
| 2006/0095634 | A1 | * | 5/2006  | Meyer ........................ | 710/309 |

FOREIGN PATENT DOCUMENTS

| EP | 1026595 |   | 8/2000 |
|----|---------|---|--------|
| EP | 1170669 |   | 1/2002 |
| JP | 2003186823 | A * | 7/2003 |

* cited by examiner

Primary Examiner—Christopher E. Lee
(74) Attorney, Agent, or Firm—Nicholas J. Pauley; John L. Ciccozzi (57) ABSTRACT

Embodiments of the invention are directed to a method and apparatus for reducing transfer latency in a system on a chip, the system on a chip comprising a bus master, a bus slave and an arbiter, wherein the bus master, bus slave and arbiter are in electronic communication therebetween. A request is transmitted from the bus master to the arbiter, wherein a priority signal is associated with a latency requirement. The arbiter reviews the latency requirement prior to transmitting the request to the bus slave and determines whether to elevate the priority signal. The request signal is then transmitted from the arbiter to the bus slave. The bus slave fulfills the request and transmits a response to the request, wherein the transmission includes the priority signal.

21 Claims, 7 Drawing Sheets

| Priority[1:0] | Latency |
|---|---|
| 0b00 | Not latency critical |
| 0b01 | Service within 100 cycles |
| 0b10 | Service within 50 cycles |
| 0b11 | Service within 30 cycles |

METHOD AND APPARATUS OF REDUCING TRANSFER LATENCY IN AN SOC INTERCONNECT

BACKGROUND

1. Field of the Invention

Embodiments of the invention are directed to a method and apparatus for sequencing transfer requests from a bus master to a bus slave on a System on Chip ("SOC") interconnect. In particular, embodiments are directed to a method and apparatus for reducing transfer latency between a bus master and a bus slave by altering the priority of requests in an SOC interconnect.

2. Relevant Background

System-on-chip (SOC) technology operates and controls various types of systems. In general, SOC technology is the assembling of all the necessary electronic circuits and parts for a "system" (such as a cell phone or digital camera) on a single integrated circuit ("IC"), generally known as a microchip.

SOCs typically include initiators, also known as bus masters (for example, processors, graphics engines, direct memory access ("dma") engines, and the like), bus targets (for example, memory controllers), and system buses, also known as interconnects. To operate the system that the SOC is intended to control, a bus master initiates a transfer request to a target, also known as a slave, via the system bus or interconnect. If multiple masters desire to access a particular slave simultaneously, the requests for these multiple masters must be processed through a central arbiter, or arbitration system. The arbitration system controls the communications between the masters and the slaves; in particular, it controls the order in which the masters communicate with the slaves.

The order in which the masters communicate with the slaves can be important if the requests from the masters are latency, or time, restricted. Typically, each master in the SOC can have a latency requirement for each request. A latency requirement identifies the time constraint, if any, for fulfilling the request. For example, a video engine may be required to write a certain number of frames/second to create a picture or image, and may write these frames from its internal buffer into main memory. If the memory controller, that is, the slave, is unable to accept or service these requests in a timely fashion, the buffer in the video engine will overrun and the picture produced will be incomplete and jagged.

Latency requirements can be dictated by the particular master, or the particular type of request regardless of the master transmitting the request. Although the latency requirements of the request may be critical, in current systems, there is no transference of the latency requirement from the master to the slave. Thus, all of the requests having the same priority are perceived by the slave to be of equal urgency. As such, in some instances, requests that are more latency critical may not be responded to in a timely manner.

When a master transmits a request to the arbitration system to access a slave, the master transmits a request signal to the arbitration system. As stated above, some transfer requests are latency critical, that is, there is a time constraint upon the fulfillment of the request. In these instances, a priority may be associated with the request. Regardless of the priority associated with the request, the arbitration system is unaware of the latency constraint, and thus, will manage each request identically, unless otherwise instructed.

To overcome the lack of identification of the latency requirement with the request, in some SOCs, a particular master will always be given highest priority regardless of the request. Since all of the requests from the particular master are given the highest priority, requests from the master that have a lower priority will be placed before higher priority requests from another master. In these instances, it is difficult to optimize the use of the bus.

To avoid starving requests from some masters in lieu of a specific master, the arbitration system in some SOCs will permit the masters to communicate with the slaves using a fair round robin scheme. For instance, a system comprising masters $M_0, M_1 \ldots M_n$, and slave S, prioritizes communication with the slave S as follows: $M_0, M_1 \ldots M_n$; → $M_1 \ldots M_n, M_0$; → $\ldots$ → $M_n, M_0 \ldots M_{n-1}$. Although this more evenly allows access to the slave by the masters, it fails to resolve the problems associated with requests of differing latency criteria.

Further issues arise as requests may be resident in an internal buffer prior to being granted by the arbitration system. Since the amount of elapsed time is not recognized by the arbiter, the request is transmitted without regard for the amount of time that has elapsed since the master initiated the request. Even though a request is granted by the arbiter, it may be transferred to another layer of interconnect or a bridging device and not the final target. Additionally, once the request is transmitted to the final target, it may be placed in a queue behind other earlier received requests regardless of the amount of time that has elapsed between the initial request and reaching the final target. In this regard, the latency requirement of the master may have expired prior to the request being acted upon.

A need in the industry exists which allows for the transfer of latency requirements appurtenant to a request from a requesting master to a slave. A further need exists for a system which can reprioritize a previously defined schedule for response to requests in accordance with the latency requirements of the requests, and thereby reduce transfer latency.

SUMMARY OF THE DISCLOSURE

Embodiments of the invention are directed to a method and apparatus for reducing transfer latency in a system on a chip. Embodiments of the system on a chip include a bus master, a bus slave and an arbiter, wherein the bus master, bus slave and arbiter are in electronic communication therebetween. A request having a priority signal, the priority signal being associated with a latency requirement is transmitted from the bus master to the arbiter. The arbiter reviews the latency requirement prior to transmitting the request to the bus slave to determine whether to elevate the priority signal. The request signal is then transmitted from the arbiter to the bus slave. The bus slave transmits a response to the request, wherein the transmission may include the priority signal.

A feature of embodiments of the invention is that the latency requirement of a request is transmitted with the request from the master to the slave. An advantage of this feature is that the request can be fulfilled in accordance with the latency requirements.

A further feature of embodiments of the invention is that the bus slave can re-prioritize the order of responses to instructions based upon the latency requirements of the instructions. An advantage to this feature is the bus slave can reduce the consumption of system resources.

Another feature of embodiments of the invention is that the slave returns the priority of the request to the arbiter with the return data. An advantage of this feature is that the arbiter is able to determine the transmission order of the return data to a single master.

DETAILED DESCRIPTION OF THE EMBODIMENTS

Figure 1:
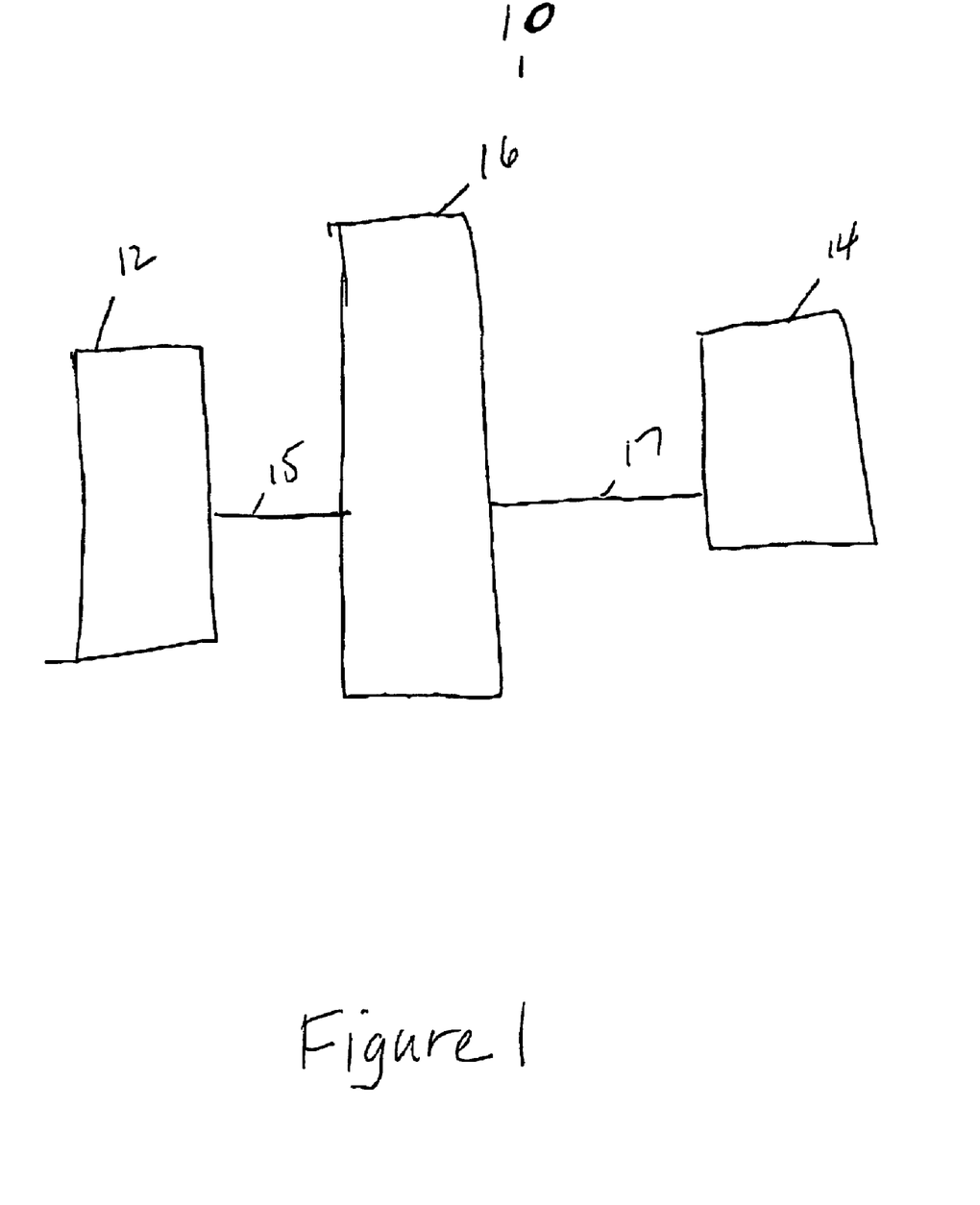
FIG. 1 is a block diagram of an SOC interconnect having one master, slave and arbiter.

Embodiments of the present invention are directed to a method and apparatus for sequencing transfer requests between a bus master and a bus slave on an SOC interconnect. Embodiments of the invention operate on a SOC interconnect, wherein at least one bus master communicates with a bus slave via an arbiter. With reference to FIG. 1, the SOC interconnect 10 comprises at least one bus master 12, a bus slave 14 and an arbiter 16, wherein the bus master 12, bus slave 14 and arbiter 16 are in electronic communication therebetween via buses 15 and 17.

The bus master 12 can be any type of device that is configured to initiate transactions on the bus 15, such as, instructions to store data in memory or read data from memory. For example, the bus master 12 includes, but is not limited to, processors and graphic engines.

The bus master 12 transmits a request signal to the arbiter 16. The request signal indicates that the bus master 12 is requesting access to the bus slave 14 that resides on bus 17. Depending upon the bus 15 protocol between the bus master and the arbiter, the request signal can include the instructions intended for the bus slave 14. If the request signal does not include the instructions intended for the bus slave 14, the bus master 12 stores the instructions in a storage device (not shown) and awaits a signal from the arbiter to transmit the instructions. If the request signal includes the instructions for the bus slave 14, the instructions can be stored in the arbiter 16 in an internal storage device or an external storage device coupled thereto (not shown).

The bus master 12 can have a predefined priority associated with each type of instruction or dynamically assign a priority to each instruction. The priority is related to a latency requirement which defines the time frame in which a particular instruction must be completed. The latency requirements can be fixed requirements, for example, a single number or a descriptor (such as, high, medium, or low), can be a binned value, or can be a specific cycle or time value. If the latency requirement is binned, the latency binning will represent groups of requirements, such as, ranges or the upper limits of tolerance. For example, the latency requirement can be 3 (a fixed value), high (a descriptor), between 20-40 cycles or up to 40 cycles (binning). In some embodiments, the priority is identical to the number of clock cycles (or time) remaining until the request must be fulfilled. In these embodiments, the latency requirement that is transmitted with the request corresponds to the remaining number of cycles to complete the request. However defined, the priority associated with the instruction, and thus, associated latency requirement, is transmitted with the instruction either at the time the request signal is transmitted or when the instruction is authorized for transmission by the arbiter.

Although the bus master can assign the priority for each request, in some embodiments, the priority can be assigned by the arbiter. Thus, the priority can be assigned either by the master when it makes a request to the arbiter or when the master's request is queued in the arbiter. If the priority is assigned by the arbiter it could be a single static value for all requests from the master or could be a value determined by the type of request made by the master.

The bus slave 14 is a target device which is configured to respond or service the instructions from the bus master 12, but does not generate instructions. For example, a bus slave 14 can be a memory controller. In preferred embodiments, the bus slave 14 is configured to receive instructions, including the priority status and associated latency requirements of the instructions, and process the instructions in accordance with the latency requirements.

The bus slave is configured to receive multiple instructions from one or more masters. The plurality of received instructions is placed in a queue until the bus slave is able to fulfill a given instruction. In some embodiments, the bus slave only recognizes the priority of the incoming instructions, and thus, prioritizes the order of the response to the instructions in accordance with the priority of each instruction. However, in other embodiments, the bus slave is aware of the latency requirements, and thus, the bus slave can prioritize the order of response of the instructions in its queue in accordance with the latency requirements.

Once the bus slave has performed in accordance with the instructions, the bus slave transmits the return data, if any, to the arbiter 16. The return data can include any type of information, including, but not limited to, a set of data requested by the bus master, a response to an inquiry, or an acknowledgment that the instructions have been completed. In some instances, no response is returned by the bus slave upon completion of the instructions, unless the bus master further requests confirmation of the completion of the task.

The arbiter 16 is a controller that receives the request signal from the bus master 12 and controls the transmission of the instructions from the master to the slave, and the transmission of return data from the slave to the master. In some embodiments, the arbiter only receives the request signal and the instructions are stored in the bus master. In this instance, when the bus 17 to the bus slave is available, the arbiter transmits a signal to the bus master 12 instructing it to transmit the instructions.

Upon receipt of the request signal, the arbiter tags, that is, time stamps, the request signal. If the request signal is coupled to the instructions, the arbiter can also time stamp the instructions. The instructions are then stored in a queue in the arbiter. The time stamp allows the arbiter to track the amount of time that has elapsed between the receipt of the request signal and the ultimate transmission of the instructions to the bus slave 14.

Regardless of when the instructions are transmitted to the arbiter, as discussed above, the priority of the instructions, and associated latency requirement, is transmitted with the instructions. As will be discussed below, the arbiter utilizes the latency requirement and time stamp of the instructions or the time stamp of the signal request to determine whether the priority of the instructions require elevating, that is, updating, prior to transmitting the instructions to the bus slave. If too much time has elapsed since the bus master transmitted the initial request signal, the arbiter is configured to elevate the priority status of the instructions. In this regard, the latency requirement will be automatically changed to reflect the new priority status. The priority status will alert the bus slave to the actual time constraints for responding to the instructions. In some embodiments, the arbiter stores the request signal and its time stamp, and is configured to continue elevating the priority status of the request during the period in which the request is resident with the bus slave. In this regard, the arbiter is aware of the latency requirement of the request upon return of the request from the bus slave.

Figure 2:
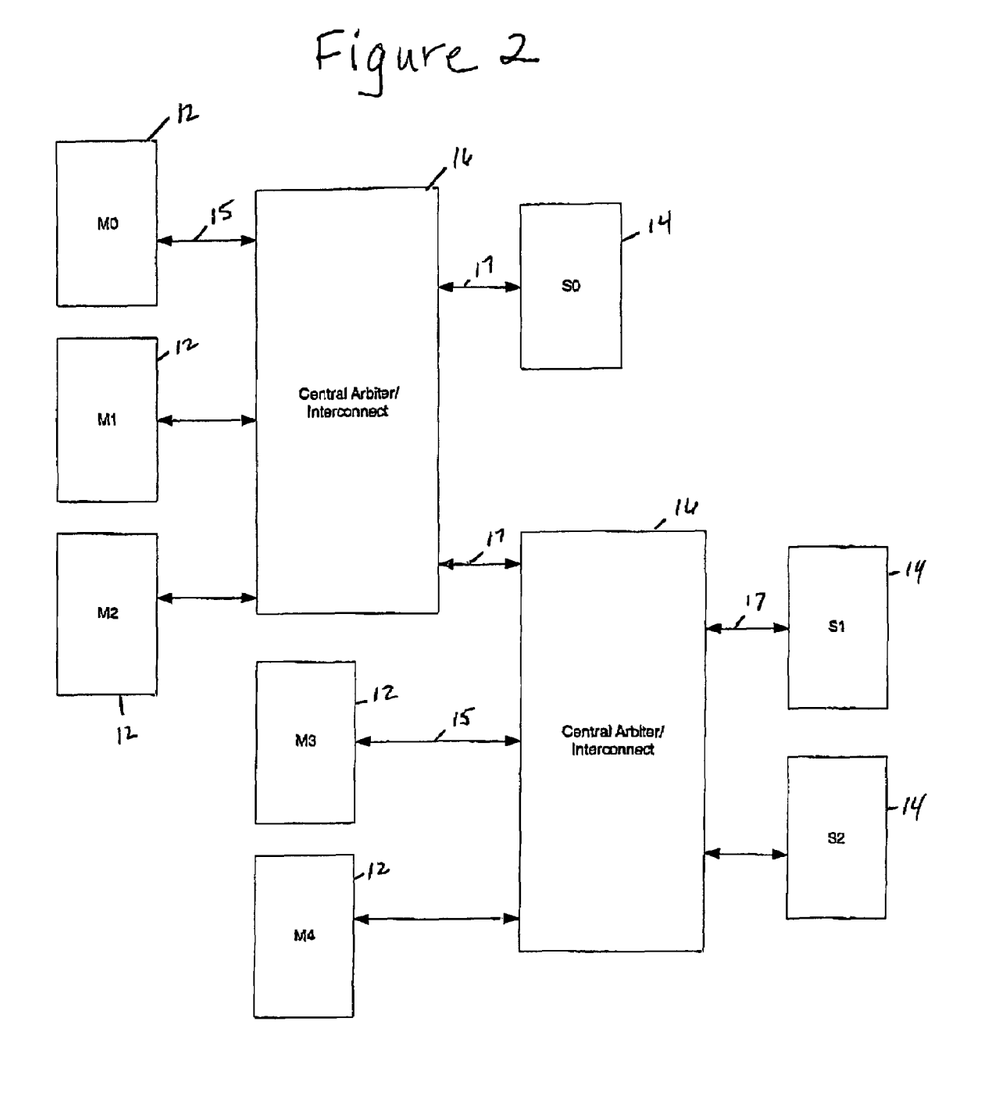
FIG. 2 is a block diagram of an SOC interconnect having a plurality of masters, slaves and arbiters.

With reference to FIG. 2, the SOC interconnect can include a plurality of masters, slaves, arbiters, or any combination thereof. The multiplicity of the arbiters creates a plurality of levels of interconnects. Thus, to reach some desired slaves, for example, $S_1$ and $S_2$, the request must pass through multiple arbiters, each with its own queue for transmission. In multi-layered interconnects, the arbiters can elevate the priority of the instructions as the instructions are passed from one level to the next. In this regard, the latency requirements associated with the instructions are not lost or disregarded, thereby allowing the bus slave to provide a timely response to the instructions.

Figure 3:
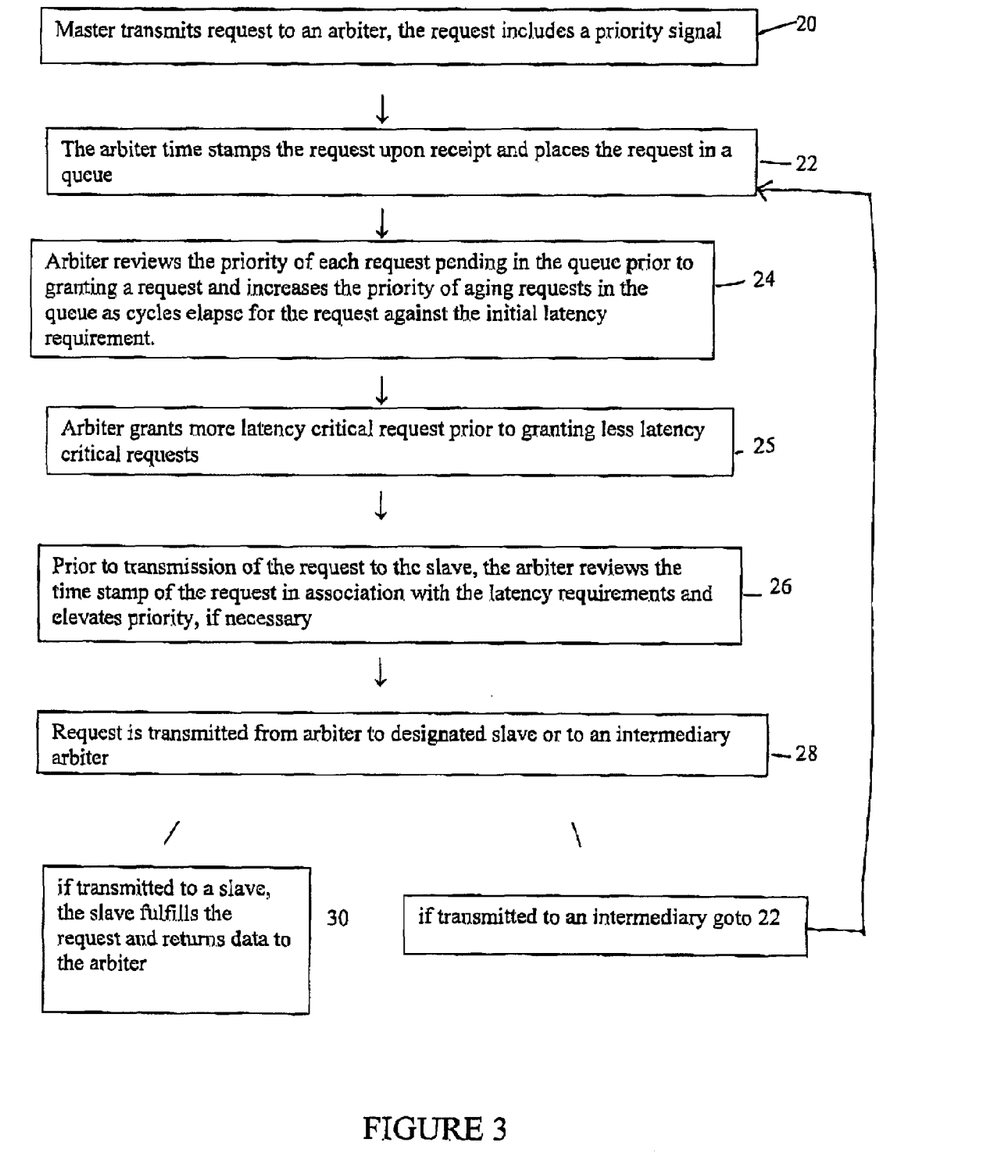
FIG. 3 is a flow diagram of a method for reducing transfer latency.

Overall and with reference to FIG. 3, in one embodiment for reducing transfer latency, the master transmits a request to the arbiter, wherein the request includes a priority signal 20. Upon receipt of the request, the arbiter time stamps or tags the request and places it in a queue 22. Prior to granting any requests, the arbiter reviews the relative priority of each request pending in the queue, and increases the priority of aging requests in the queue as cycles elapse for the request against the initial latency requirement 24. If the latency requirement is defined as the priority, where the lowest number is most urgent, each cycle a request resides in the queue will cause one (1) to be subtracted from its priority value. The arbiter grants more latency critical requests prior to granting less latency critical requests 25. Once the request is granted, the arbiter reviews the time stamp in association with the latency requirement and updates the priority of the request, if necessary 26. The request is then transmitted from the arbiter to the designated slave or to an intermediary arbiter 28. If the request is transmitted to the slave, the slave fulfills the request and returns data to the master via the arbiter 30. If the request is transmitted to an intermediary arbiter, the intermediary arbiter time stamps the request 22 and processes the request as described above.

As discussed above, when the master 12 transmits a request, the request includes a priority signal. In some embodiments, the priority signal is included in a sideband signal transmitted with the request, wherein the sideband signal is a collection of signals associated with the request and identifies the transfer qualifiers. For instance, the sideband signal can include, but is not limited to, the type of transfer, the size of the transfer, the address of the device to be accessed, and the priority signal of the instruction. The transfer qualifiers can change and may be dependent upon the bus 15, 17 protocol.

Figure 4:
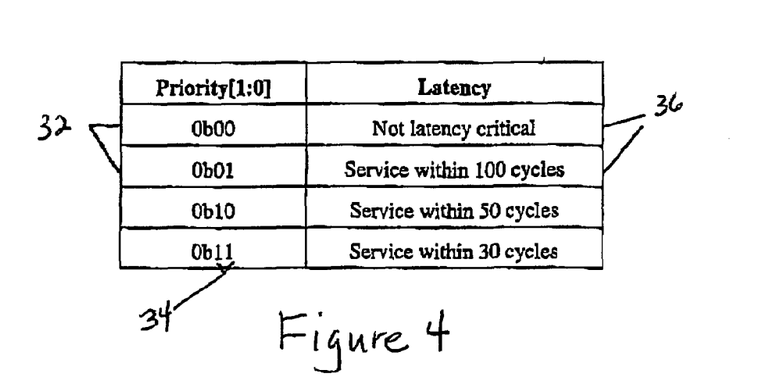
FIG. 4 is an exemplary table of priorities and associated latency requirements.

The priority signal has a variable width that can be encoded wherein the encoding is associated with the latency requirements. With reference to FIG. 4, the priority signal is identified by a priority identifier 32, such as, "0bxy", where xy identifies the latency binning 34. In this example, the width is two bits, however, it is to be understood that the width can be any suitable width. The greater number of bits used to identify the latency binning increases the amount of granularity to determine the latency requirements.

Each priority identifier 32 is associated with a latency identifier 36. The latency identifier 36 defines the latency requirement, including identifying that the request has no latency requirement. The latency requirement can be defined by any suitable manner, including, but not limited to, the number of cycles, or a range of cycles. For example, a priority identifier of 0b00 has no latency requirements, and 0b01 is associated with a latency identifier 36 of "service within 100 cycles". In another example, the latency requirement can be identified as service between 30-50 cycles. In some embodiments, the latency requirements corresponding to a bus master's priority encoding may be programmable through a register in an arbiter. In this regard, the latency requirements can be changed with respect to the priority identifier 32.

Upon receipt and acceptance of the priority signal, the arbiter time stamps, or tags, the incoming request that is then queued for arbitration. As discussed above, prior to granting a request, the arbiter reviews the relative priorities of the received requests, which can emanate from the same master, or different masters. Requests having a lower latency requirement are generally granted prior to those with a higher latency requirement. Requests of equal priority can be granted in any suitable order, including, but not limited to, granting the request based upon the earliest time stamp.

Figure 5:
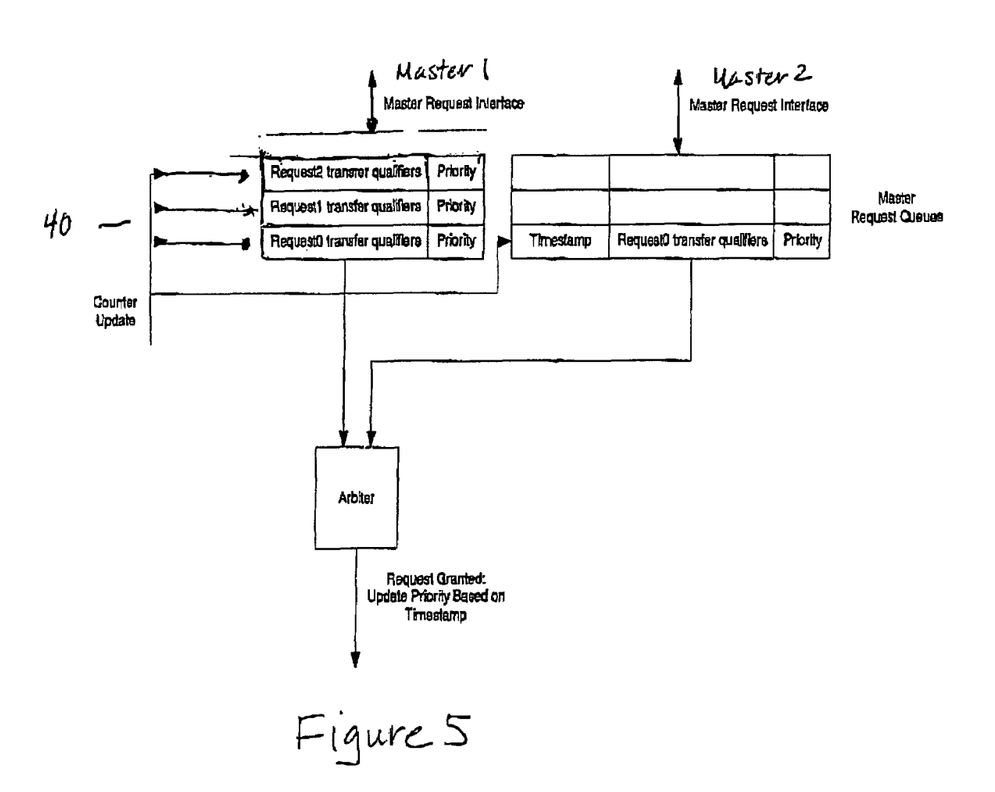
FIG. 5 is a schematic of a master request queue coupled to the arbiter.

Once a request is to be granted, the arbiter reviews the priority identifier 32 in relation to the tag or time stamp of the request. In this regard, the arbiter determines whether the priority identifier 32 requires elevation or updating. With reference to FIG. 5, as discussed above, upon receipt of a request from a master, for example, Master1, the arbiter places a time stamp of "0" on the request. The request is placed in a master request queue 40 in relation to the time stamp and priority. At each interval of 'n' clock cycles, the arbiter increments or ages the time stamp for all pending requests in the queue for each master. Thus, with respect to FIG. 5, the arbiter increments the time stamp for Request0, Request1 and Request2 in the queue for Master1 and also increments the time stamp for Reqeust0 in the queue for Master2. The increase of the time stamp allows the arbiter to determine the age of the request relative to the latency requirement of the request. In this regard, when the request is granted, the priority can be updated based upon the aged time stamp. For example, with reference again to FIG. 4, assume a request originally having a priority of 0b10 has an aged time stamp of three. If 'n' clock cycles represent an interval value of 10, then the request has been pending for at least 30 cycles prior to being granted. In accordance with FIG. 4, a priority of 0b10 requires service within 50 cycles. Since the request must now be responded to within 20 cycles, the priority must be elevated to reflect the new time constraints. Thus, in this instance, the arbiter would change the priority identifier from 0b10 to 0b11, to reflect the necessity of service within 20 cycles. As such, when this request is transmitted to the slave, or another level of interconnect, the recipient is aware that the request must be serviced within 20 cycles. As the request is transmitted through multiple interconnects, the priority is adjusted, thereby updating the latency requirement of the request in real time. The interval value for 'n' can be programmed into the arbiter, and thus, can be changed.

To determine which request to grant, in some embodiments, the arbiter reviews the oldest request in each queue for each master. For example, the arbiter would review Request0 in the queue for Master1 (assuming Request0 is the oldest) and Request0 in the queue for Master2. The arbiter would compare the two requests to determine which request is more latency critical, and grant that request. In other embodiments, the arbiter determines which request is the most latency critical in the queue for each master regardless of the age of the request. For example, assuming Request1 in the queue for Master1 is the most latency critical of the three pending requests, the arbiter would compare the latency requirements of Request1 and Request0 in the queue for Master2 to determine which request to grant.

Figure 6:
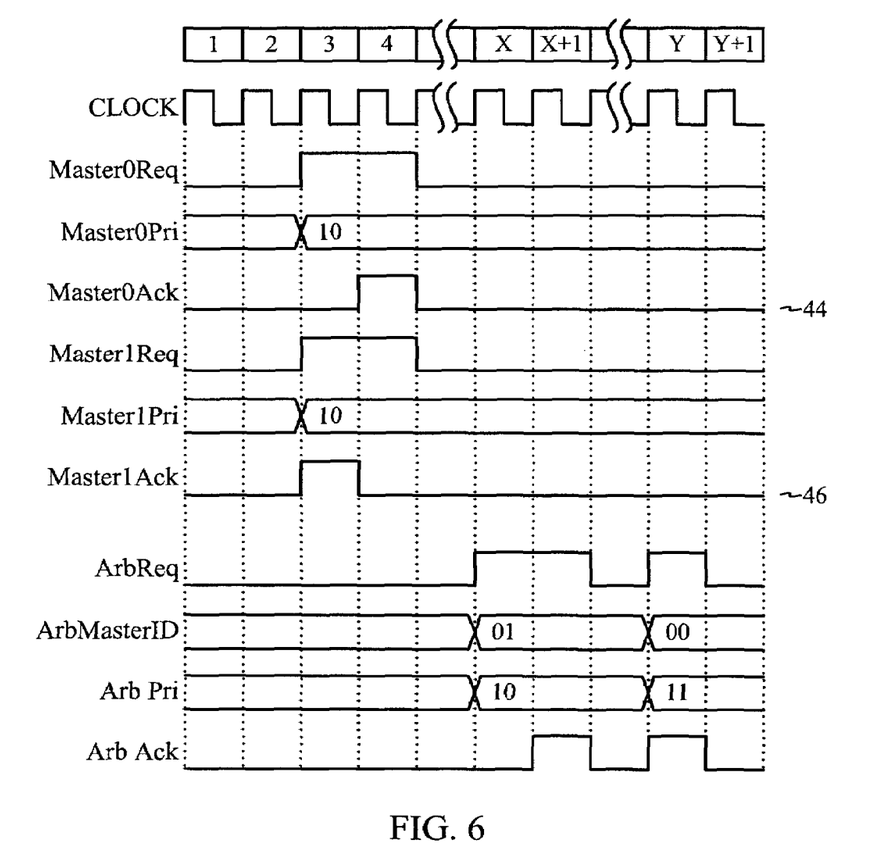
FIG. 6 is a schematic illustrating a priority elevation scheme.

In another example, and with reference to FIG. 6, two masters $M_0$ and $M_1$ transmit a request signal with instructions (collectively, a request) to the arbiter at substantially the same time. Each request has a priority of 0b10. Both requests are acknowledged by the arbiter 44, 46; however, the acknowledgment of each request occurs at different cycles. In particular, the acknowledgment for M0 occurs at the fourth cycle 44 and the acknowledgment for $M_1$ occurs earlier at the third cycle 46. At time x, the arbiter grants the request for $M_1$. Since the request has been granted before the elapsed amount of time requires the elevating of the priority of the request, the arbiter does not change the priority of $M_1$. At time y, the arbiter grants the request of $M_0$. However, at time y a sufficient number of cycles have elapsed such that the priority of $M_0$ must now be elevated to 0b11. Thus, the arbiter transmits the request $M_0$ to the bus slave with the elevated priority. The requests are received by the slave, including the priority information. In embodiments wherein the bus slave does not recognize the latency information and only reviews the priority status of the instructions, the bus slave fulfills the highest priority instruction first. In some embodiments, some slaves may also not recognize the priority information. Although these slaves will treat all incoming requests equally, the requests will be presented to the slave by the arbiter in a manner which is optimal for reducing latency.

Thus, in the example above, despite the fact that the request for $M_0$ was received subsequent to the request for $M_1$, the slave is initially aware that the request from $M_0$ should be acted upon prior to the request for $M_1$. As the arbiter has reviewed the priority of the instructions with respect to the latency requirements, the priority more accurately reflects the status of the instructions than in systems wherein the arbiter does not elevate the priority. If the bus slave does not recognize the priority of the request, the bus slave fulfills the requests in the order in which they are received. However, as indicated above, in these instances, the arbiter has presented the requests to the bus slave in a manner which is optimal for reducing latency.

As discussed above, in some embodiments, the actual order in which the slave responds to the instructions can be re-prioritized based on the latency requirements of the instructions in the queue. In some embodiments, by comparing the latency requirements of the instructions in the queue, the bus slave can re-prioritize the order in which to respond to the instructions to increase efficient use of system resources. For example, based upon the latency requirements of an instruction, a bus slave can assess whether it is capable of fulfilling a lower priority instruction prior to the fulfillment of a higher priority instruction and still meet the latency requirements for both instructions.

Figure 7:
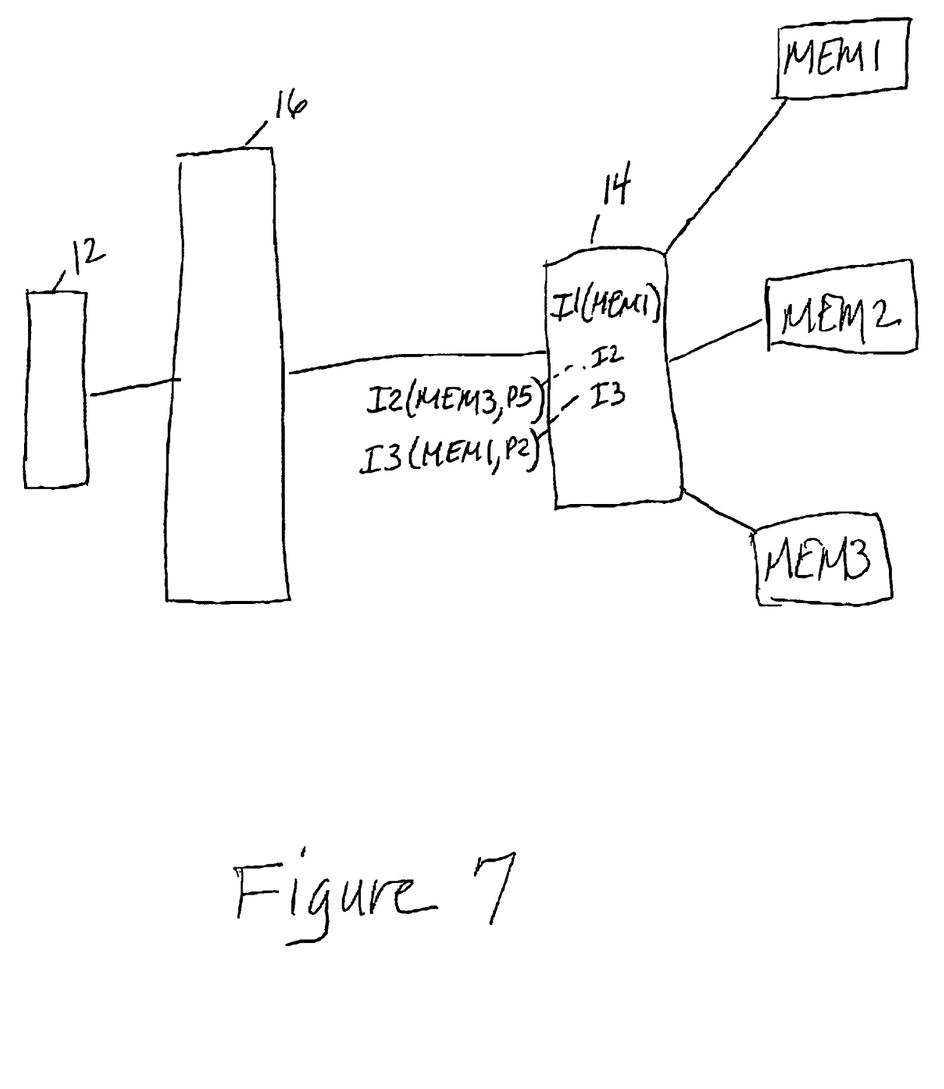
FIG. 7 is a schematic of a bus slave re-prioritizing the order of responding to received instructions.

At times, re-ordering instructions may allow the bus slave to reduce consumption of system resources, such as power, because it can efficiently access a given system device. For example, and with reference to FIG. 7, the bus slave receives a first instruction I1 to retrieve data from a first memory device MEM1. While the bus slave is retrieving the data, a second instruction I2 and third instruction I3 is transmitted to the bus slave. The second instruction has a higher priority P5 than the third instruction P2. However, the third instruction I3 is instructing the bus slave to access the first memory device MEM1 and the second instruction I2 is instructing the bus slave to access a third memory device MEM3. Upon completion of the retrieval of data for the first instruction I1, the bus slave can review the latency requirements of the two remaining instructions and determine whether it can fulfill the third instruction I3 prior to the fulfillment of the second instruction I2 given the constraints of the latency requirements of the second instruction I2. For example, if the latency requirements of the second instruction I2 require fulfillment of the instruction within 30 cycles, and the bus slave determines it can fulfill the third instruction I3 within 10 cycles, and then fulfill the second instruction I2 within 15 cycles, the bus slave can timely fulfill both instructions. If the bus slave can efficiently fulfill all three instructions, resources of the system will be conserved because the bus slave will re-access the same memory device without turning the memory device off and then back on to retrieve the requested data for the third instruction. This will reduce power consumption in the system.

Upon fulfillment of the request by the slave, the slave transmits the return data. In addition to the return data, the slave may return the updated priority identifier 32. In some embodiments, the bus slave is configured to compare the time stamp of when it received the instruction, and the elapsed time to fulfill the instruction as calculated from receipt of the instruction by the bus slave. As discussed above, if the elapsed time places the instruction in a new latency binning, in some embodiments, the bus slave is configured to elevate the priority of the instruction by updating the priority identifier 32 to the next highest priority identifier 32 to reflect an elevated priority. The return data is then transmitted to the arbiter.

To determine the order to transmit the return data from one or more slaves targeted for a given master, the arbiter utilizes the priority identifiers 32 returned by the slave and a time stamp taken when the first (or only) piece of return data is observed by the interconnect to assess which requests are more latency critical. In some embodiments, the slave does not return a priority identifier. Instead, the arbiter maintains a record of the transmitted requests in association with the priority of the request and as time elapses updates the priorities as described above. Based upon the relative priorities of all return transfers competing for access to a particular master, the arbiter determines which requests, if any, to buffer or throttle (that is, transmit a signal to the slave that it is not able to accept the return data) and transfers more latency sensitive requests more quickly without the further delay of throttling the transfer or placing them in a buffer. The use of the relative priorities allows the arbiter to re-prioritize the return data regardless of the order of return from the bus slave.

Figure 8:
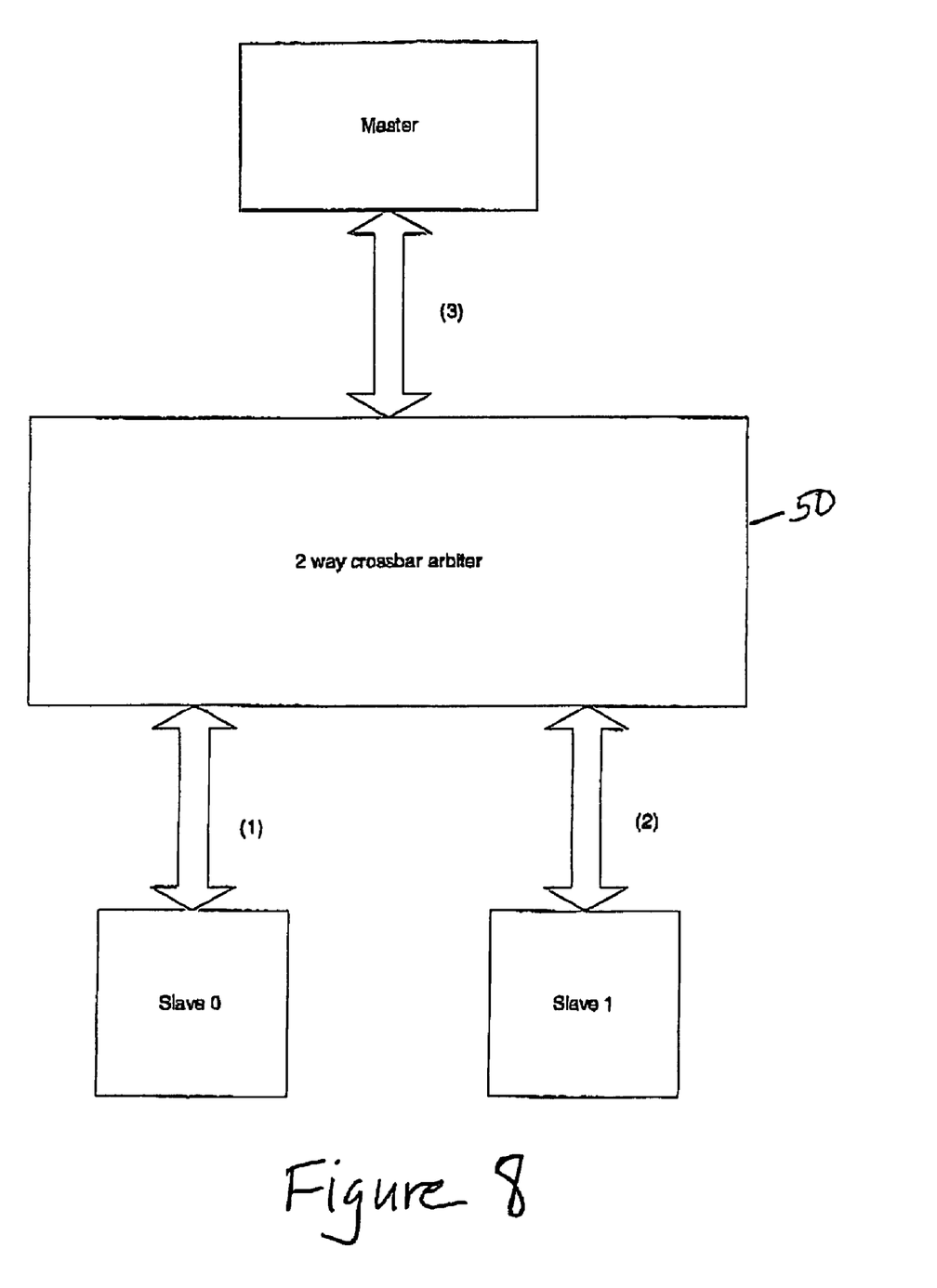
FIG. 8 is a block diagram of a configuration having two slaves and a single master.

With reference to FIG. 8, in one example, a two-way crossbar arbiter interconnect 50 is coupled to a master via bus (3) and a plurality of slaves $S_0$ and $S_1$ via buses (1) and (2). The master transmits two read requests to different slaves, wherein the latency requirement of the read request to $S_0$ is lower than the request to $S_1$. Both requests are transmitted to the arbiter 50 via bus (3), which in turn transmits the requests to the different slaves in the manner described above. The requests are completed by the slaves and, in this example, are ready for transmission substantially simultaneously to the arbiter 50. Since there are multiple buses (1) and (2) for transmission, there is no issue regarding the order of transmitting the return read data to the arbiter 50. However, since only a single bus (3) is available to the master, the arbiter must determine which read data will be prioritized for transmission to the master. A determination is made based upon the latency requirements of the requests. As such, the arbiter selects the read data from $S_0$ since the arbiter is aware of the latency requirements of the requests. Thus, the read data from $S_0$ is transmitted to the master, and the read data from $S_1$ is either throttled or buffered internally in the arbiter or placed in a queue until the bus (3) connecting to the master is available after the transfer of the read data from $S_0$.

Although the foregoing described the invention with preferred embodiments, this is not intended to limit the invention. Indeed, the foregoing is intended to cover all modifications and alternative constructions falling within the spirit and scope of the invention as expressed in the appended claims, wherein no portion of the disclosure is intended, expressly or implicitly, to be dedicated to the public domain if not set forth in the claims.

What is claimed is:

1. A method for reducing transfer latency in a system on a chip, the system on a chip having a bus master, a bus slave and an arbiter, the bus master, bus slave and arbiter being in electronic communication, the bus slave being configured to respond to a request, comprising:
    transmitting, from the bus master to the arbiter, a request and a priority signal, the priority signal being associated with a latency requirement;
    reviewing the latency requirement to determine whether to elevate the priority signal;
    transmitting, from the arbiter to the bus slave, the request and priority signal; and
    transmitting, from the bus slave to the arbiter, the response to the request and the priority signal.

2. The method as claimed in claim 1, further comprising time stamping the priority signal.

3. The method as claimed in claim 1, further comprising elevating the priority signal.

4. The method as claimed in claim 2, further comprising comparing the time stamp with the latency requirement to determine whether to elevate the priority signal.

5. The method as claimed in claim 1, further comprising placing the request in a queue for transmission to the bus slave.

6. The method as claimed in claim 1, wherein the request is a first request, the priority signal is a first priority signal and the latency requirement is a first latency requirement, further comprising:
    transmitting, from the bus master to the arbiter a second request having a second priority signal, the second priority signal being associated with a second latency requirement, wherein the second priority signal is higher than the first priority signal; and
    transmitting, from the arbiter to the bus slave, the second request and second priority signal.

7. The method as claimed in claim 6, further comprising:
    comparing the first priority signal and the second priority signal; and
    fulfilling, by the bus slave, the second request prior to fulfilling the first request.

8. The method as claimed in claim 6, further comprising:
    comparing the first latency requirement and the second latency requirement; and
    fulfilling, by the bus slave, the first request prior to fulfilling the second request.

9. The method as claimed in claim 1, the system on a chip having a first arbiter, a second arbiter, a first bus slave and a second bus slave, the first arbiter being coupled to the master and the second arbiter, the first bus slave being coupled to the first arbiter, and the second bus slave being coupled to the second arbiter, wherein a second request from the bus master is transmitted from the bus master to the second bus slave through the first arbiter and the second arbiter, further comprising:
    reviewing the latency requirement prior to transmitting the second request to the second arbiter to determine whether to elevate the priority signal; and
    reviewing the latency requirement prior to transmitting the second request to the second bus slave to determine whether to elevate the priority signal.

10. The method as claimed in claim 9, further comprising: elevating the latency requirement by at least one arbiter.

11. The method as claimed in claim 9, further comprising: elevating the latency requirement prior to transmission of the request to second arbiter;
    elevating the latency requirement prior to transmission of the request to the bus slave.

12. The method as claimed in claim 1, further comprising: elevating, by the bus slave, the priority of the request prior to the transmission of the response to the request to the arbiter.

13. The method as claimed in claim 1, further comprising: elevating the request signal, by the arbiter, while the request is resident with the bus slave.

14. A system on chip interconnect, comprising:
    a bus master, the bus master being configured to transmit a request signal, the request signal being associated with a priority signal and a latency identifier, the priority signal identifying a priority status of the a request and the latency identifier identifying time requirements for responding to the request;
    a bus slave being configured to receive the request signal, the priority signal and the latency identifier; and
    an arbiter, the arbiter being coupled to the bus master and bus slave, wherein the request signal, priority signal and latency identifier are transmitted from the bus master to the bus slave via the arbiter, and wherein the bus slave is configured to transmit the priority signal and latency identifier to the arbiter.

15. The system as claimed in claim 14, the priority signal is configured to be encoded, wherein the encoding is associated with the latency identifier.

16. The system as claimed in claim 14, wherein the priority signal comprises a variable width, the variable width being configured for encoding.

17. The system as claimed in claim 14, the latency identifier being selected from one of the group of a fixed number, a descriptor, a range of clock cycles and an upper cycle limit.

18. The system as claimed in claim 14, wherein the bus slave is configured to elevate the priority signal and transmit the elevated priority signal to the arbiter.

19. The system as claimed in claim 14, further comprising:
- a plurality of arbiters, a first arbiter coupled to the bus master and further coupled to a second arbiter, each arbiter being configured to elevate the priority signal, the elevation of the priority signal associated with a new latency identifier;
- a plurality of bus slaves, a first bus slave being coupled to the first arbiter, and a second bus slave being coupled to the second arbiter, each bus slave being configured to elevate the priority signal.

20. The system as claimed in claim 14, further comprising:
- a plurality of arbiters, a first arbiter coupled to the bus master and further coupled to a second arbiter, each arbiter being configured to elevate the priority signal,
- a plurality of bus slaves, a first bus slave being coupled to the first arbiter, and a second bus slave being coupled to the second arbiter, each arbiter being configured to elevate the priority signal while the request is resident with the bus slave.

21. The system as claimed in claim 14, wherein the arbiter is configured to elevate the priority signal while the request is resident with the bus slave.

* * * * *